United States Patent Office 3,451,831
Patented June 24, 1969

3,451,831
PROCESS FOR AGGLOMERATING VITRIFIABLE MASSES AND THE PRODUCTS THEREOF
André Miche, Mont-sur-Marchienne, Belgium, assignor to Glaverbel S.A., Brussels, Belgium
No Drawing. Filed June 22, 1965, Ser. No. 466,120
Claims priority, application Luxembourg, July 24, 1964, 46,611; Nov. 7, 1964, 47,308
Int. Cl. C03c 3/04
U.S. Cl. 106—52                    10 Claims

ABSTRACT OF THE DISCLOSURE

Subjecting to an atmosphere of an acid gas an essentially homogeneous admixture which comprises a vitrifiable mass suitable for glass manufacture and includes at least one metal hydroxide results in an essentially homogeneous agglomerate when the metal hydroxide is incorporated in the vitrifiable mass in the form of a concentrated aqueous solution.

---

The present invention relates generally to a process for agglomerating vitrifiable masses, and more particularly to a process for agglomerating vitrifiable masses suitable for the manufacture of glass.

It is well known that glass is manufactured by melting vitrifiable masses of suitable composition in furnaces. Compositions suitable for this purpose generally comprise a number of ingredients of varying chemical and physical compositions, such as, for example, silicia or sand, limestone, dolomite, feldspar, alkali carbonates, etc., the various ingredients used being intimately mixed together in the desired proportions and then heated to a molten state where they react with each other and form glass. In order to obtain homogeneous glasses, it is necessary that prior to being placed in a molten state the mixture of ingredients be as uniform as possible and that the various ingredients during the reaction of the melting be in as intimate contact with each other as possible. Because of the relatively high viscosity of the molten ingredients and the resultant poor mixing, it is necessary that the ingredients be thoroughly mixed and in as intimate contact with each other as possible before they are melted. Usually, the finer the particle size of the various ingredients and the more intimately they are mixed, the more uniform the resultant glass. Under such conditions, it is also usually possible to effect the desired reactions of formation and also the melting more quickly and at a lower temperature then when coarse, poorly mixed ingredients are used.

The efficient mixing of vitrifiable masses for glass manufacture involves a number of problems. Although efficient mixers have been developed for the uniform and intimate mixing of the ingredients used in glass mixture composition, the vitrifiable masses immediately upon leaving such mixers begin to lose their homogeneity and by the time they reach the melting furnace they are no longer satisfactorily homogeneous even through they had been highly homogeneous in the mixer. The densities and grain sizes of the various ingredients of the glass composition differ to such a degree from each other that when subjected to shocks and vibrations, or when dropped from a height, or when conveyed by means of conveyor belts or dump trucks, certain of the ingredients show a tendency to be conveyed into particular zones of the glass composition, which means that the resulting molten glass composition is not satisfactorily homogeneous.

Various methods have been suggested for preventing the ingredients of the vitrifiable mass from segregating prior to melting, but without completely satisfactory results. For example, an attempt has been made to accomplish this by subjecting the mixed constituents to high pressure so as to produce small masses of uniform composition in the form of granules, small plates, small balls or briquettes. It was found, however, that extremely high pressures were required to make small masses of uniform composition which would cohere together and even so the cohesion was uncertain and not satisfactory. The power consumption required for the preparation of such masses was high and the equipment used was subject to rapid wear as a result of the high pressure used and because of the abrasive character of certain of the ingredients of the composition.

In order to obtain masses of better cohesion and at the same time reduce the pressures required to produce the masses, it has been suggested that the ingredients of the masses be mixed with a product capable of binding the grains together. In order to avoid the addition of harmful ingredients, the use of alkaline materials, the presence of which is usually required in the vitrifiable charge, has been suggested. These compounds were dissolved in water and the resutling solution added to the other ingredients of the mix. The alkaline solution served to encase the grains and to join them together either by drying or by recrystallizing the alkaline compound combined with the water, as, for example, when sodium carbonate was used as the alkaline material.

Such procedures, however, did not appreciably improve the state of the cohesion of the vitrifiable mass, since it is well known that the resistance of the alkaline compounds to rupture is very low, with the result that the grains are weakly bonded together. Furthermore, when they combine with water and are subsequently recrystallized, they melt at a temperature of approximately 30 to 35° C., the particular melting point depending upon the conditions under which the recrystallization process takes place. The result is that the vitrifiable mass can not be heated prior to being intrdouced into the glass melting chamber, and hence certain heat recovery processes can not be employed.

With this in mind, it is a main object of the present invention to provide a method which overcomes the difficulties encountered with prior art procedures.

Another object is to provide a method of the character described wehrein vitrifiable masses can be produced having good cohesion and a high breaking strength.

A further object of the invention is to provide a process for use in the manufacture of glass wherein high pressures are not required for the production of cohesive homogeneous mitxures which remain homogeneous until melted and reaction of the constituents of the mitxure takes place.

These objects and others ancillary thereto are accomplished in accordance with preferred examples of the invention wherein alkaline compounds are introduced at least partially in the form of dissolved metal hydroxide and the resulting mass is then brought into contact with an atmosphere containing at least on acid gas, such as, for example, preferably carbon dioxide or a sulfur anhydride or a mixture of such gases. The dissolved metal hydroxide encases the particles of the other ingredients during their mixing so that the mass is satisfactorily homogenized without further treatment. However, when said mass is brought into contact with an acid gas, the latter combines with the metal hydroxide and produces the corresponding salt of the alkaline metal. Although the mixing of alkaline salts, such as the carbonates and sulfates, with vitrifiable masses is well known, the previous manner of use has not been found to increase the cohesion of such vitrifiable mass, whereas the procedure of the present invention has been found to give masses having excellent cohesion and a high breaking strength. While the exact reason for this improved result is not known, it is believed that the greatly improved results obtained by the process of the present invention are due to the fact that when the acid gas is brought into contact with the vitrifiable mass the acid gas reacts not only with the alkali metal hydroxide but also with the other ingredients of the mixture so as to form, between the grains, a binder of higher breaking strength.

It is desirable that the atmosphere brought into contact with the vitrifiable mass contain the acid gas in a concentration of at least 2 to 3% by volume, this amount of acid gas having been found sufficient so that the glass-making reactions can rapidly progress and the composition agglomerated so as to give satisfactory results. For this purpose, furnace combustion gas has been found to give satisfactory results. Such gases always contain acid gases, which are suitable for use in the process of the present invention. In addition, such gases contain a certain quantity of sensible heat which can advantageously be used for heating the composition.

At least 20% by weight of the alkaline ingredients of the compositions should be in the form of concentrated solutions of hydroxides, preferably solutions having a 25% concentration, i.e. 25% hydroxide and 75% water. It has been found that the use of sufficiently concentrated solutions gives good results in the form of good cohesion and high breaking strength, although good cohesion can be obtained by using more diluted solutions.

Before the composition is brought into contact with an atmosphere enriched with an acid gas, as hereinbefore specified, it is first made into relatively small particle size, as for example, to granules, small plates, small balls or briquettes. In this form, the composition is easily handled and introduced into the glass furnace. The particular form is of minor importance and can be determined by the particular type of handling and charging equipment available for this purpose.

The following examples are given for the purpose of specifically illustrating the invention hereinabove disclosed. It is specifically understood, however, that any modifications of the procedures disclosed in these examples which are obvious to one skilled in the art and which do not depart from the basic concept of the invention disclosed are intended.

Example I

For an agglomeration of a vitrifiable mass to be melted in a furnace for the manufacture of flat glass, the composition was as follows:

|  | Kgs. |
| --- | --- |
| Sand | 735 |
| Dolomite | 190 |
| Limestone | 40 |
| Feldspar | 10 |
| Sodium carbonate | 175 |
| Sodium hydroxide | 60 |

The sodium hydroxide was dissolved in 120 liters of water and subsequently added to the composition, and the resulting mixture then thoroughly mixed and shaped by means of a suitable press into small plates ranging from 5 to 10 cm. in dimensions and 3 to 5 mm. thick. These small plates were then dumped into a closed tank, and treated therein with pure carbon dioxide gas, which was brought into contact with the small plates for a period of approximately two minutes.

Samples of the vitrifiable mass treated as above described were then tested for resistance to rupture, the small plates being laid on a standardized sieve (DIN 12— Deutsche Industrial Norm, which is a German Industrial Standard), which was vibrated. After varying periods of time, the fraction of the sample which had distintegrated and passed through the sieve was measured.

Generally, the fraction passing through the sieve averaged 2.1% after 5 minutes, 2.4% after 10 minutes and 2.6% after 15 minutes. As a comparison, similar size plates were made from a similar composition in the same press but prepared by the conventional pressing method and subjected to the same testing method. After five minutes 77.6% of the plates passed through the sieve, and after 10 minutes 89% and after 15 minutes 92%, thus indicating very clearly the improved physical properties of the compositions prepared in accordance with the present invention.

Example II

In this experiment, the following composition was used:

|  | Kgs. |
| --- | --- |
| Sand | 735 |
| Dolomite | 190 |
| Limestone | 40 |
| Feldspar | 10 |
| Sodium carbonate | 125 |
| Sodium hydroxide | 100 |

The sodium hydroxide was dissolved in 100 liters of water and mixed with the remaining constituents. After thorough mixing and pressing by means of a press into granules approximately a few millimeters in size, the granules were placed in a tank and a current of smoke from a glass-melting tank passed through the granules for a period of 7 to 8 minutes. The composition of the smoke was as follows:

|  | Percent by volume |
| --- | --- |
| Carbon dioxide ($CO_2$) | 15 |
| Oxygen ($O_2$) | 2.4 |
| Sulfur dioxide ($SO_2$) and sulfur trioxide ($SO_3$) | 0.5 |
| Nitrogen ($N_2$) | Remainder |

Upon testing (in the manner described in Example I) the granules treated with the above smoke composition, it was found that the fraction passing through the sieve after 5, 10 and 15 minutes sieving amounted respectively to 1.4%, 1.8% and 2.2%.

Example III

In this experiment a vitrifiable mass suitable for making lead crystal glass having the following composition was used:

|  | Kgs. |
| --- | --- |
| Sand | 735 |
| Lead oxide | 478 |
| Alkaline carbonate | 255 |
| Potassium hydroxide | 60 |

The potassium hydroxide was dissolved in 120 liters of water and the resulting solution mixed with the remaining constituents of the mix. The mixture thus obtained was then pressed into relatively small particles by means of a press and then contacted for a period of 10 minutes with a current of carbon dioxide-containing gas. By this treatment, the resistance to rupture of the particles, when tested as described in Example I, was greatly increased over particles prepared by the previously known methods, the amount of material passing through the sieve after 5, 10 and 15 minutes being respectively 2.0%, 2.5% and 2.8%.

The process of the present invention makes it possible to obtain a granulated composition of which the elements, when considered individually, strictly conform to the analysis of the glass to be produced. Uniform mixtures of such compositions can be transported for comparatively long distances on, for example, dump trucks, without showing any appreciable disaggregation, which would result in the mixture becoming non-homogeneous.

Because of the fact that the vitrifiable mass reaching the melting furnace is more homogeneous and the particles of the mix are in more intimate contact with each other, the mass is rendered molten more rapidly and more economically than mixes otherwise prepared, that is to say, without prior agglomeration. A particular advantage in the process lies in the fact that high pressures are not required for the production of cohesive homogeneous mixtures which remain homogeneous until melted and reaction of the constituents of the mixture takes place.

In the process of the present invention when the ingredients of the mix are shaped into granules, the ingredients are brought closer to one another and because of the presence of the alkaline solution are more intimately brought into contact, so that the dimensions of the empty spaces between the particles are considerably reduced, thus resulting in the following advantages:

(1) The ingredients entering into the glass composition react more readily with each other to produce more homogeneous, compact and resistance agglomerated masses.

(2) When the raw materials are introduced into the melting furnace, their melting is materially improved and the velocity of the reaction proportionally increased.

(3) Contrary to all known processes, the resistance to rupture, shown by the granules produced in accordance with the process of the present invention, is retained until the mix is introduced into the melting furnace regardless of any treatment to which the material may normally be subjected.

As previously noted, the process is applicable generally to the treatment of any of the conventional glass mixes and is not limited to the specific mixes shown in the above examples. Likewise, alkali metal hydroxides other than those of the examples may be used so long as they are suitable for use in glass mixtures.

What is claimed is:

1. In a process for the production of a vitrifiable mass suitable for silicate glass manufacture and containing alkali metal hydroxide, the improvement wherein the alkali metal hydroxide is incorporated in the form of a concentrated aqueous solution into the vitrifiable mass, which is made homogeneous by mixing, and then subjected to an atmosphere containing at least 2 percent by volume of at least one acid gas.

2. A process according to claim 1 wherein the alkali metal hydroxide comprises at least about 20 percent by weight of alkaline ingredients in the vitrifiable mass.

3. A process according to claim 2 wherein the homogeneous vitrifiable mass is formed into relatively small particles prior to being subjected to the acid gas atmosphere.

4. A process according to claim 2 wherein said atmosphere contains carbon dioxide.

5. A process according to claim 2 wherein said atmosphere contains sulfur dioxide.

6. A process according to claim 2 wherein said atmosphere contains sulfur trioxide.

7. A process according to claim 2 wherein said atmosphere comprises combustion gas.

8. A process according to claim 2 wherein the concentrated aqueous solution has a metal hydroxide concentration of at least 25 percent.

9. A process for preparing a homogeneous agglomerate of a vitrifiable mass suitable for use in the manufacture of glass which consists essentially of: (a) forming a silicate glass mix, at least part of the alkaline ingredients of which are incorporated therein in the form of a concentrated aqueous alkali metal hydroxide solution, and (b) treating the resulting glass mix with an atmosphere containing at least 2 percent by volume of acid gas.

10. An agglomerate prepared according to claim 9.

References Cited

UNITED STATES PATENTS

| | | | |
|---|---|---|---|
| 2,220,750 | 11/1940 | Bair et al. | 106—52 |
| 2,366,473 | 1/1945 | Bair | 106—52 |
| 2,869,985 | 1/1959 | Gooding et al. | 23—110 |
| 2,945,273 | 7/1960 | Herzmark et al. | 106—38.3 |
| 3,074,802 | 1/1963 | Alexander et al. | 106—38.3 |
| 3,149,983 | 9/1964 | Maris et al. | 106—52 |
| 3,234,034 | 2/1966 | Jasiwiski et al. | 106—52 |
| 3,306,355 | 2/1967 | Maly | 106—38.3 |

HELEN M. McCARTHY, *Primary Examiner.*

U.S. Cl. X.R.

65—335